(12) United States Patent
Kane

(10) Patent No.: US 8,269,101 B2
(45) Date of Patent: Sep. 18, 2012

(54) SIGNAL DEVICE HOUSING WITH INTEGRATED RESTRICTED CONNECTIONS

(75) Inventor: Michael T. Kane, Fairport, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 498 days.

(21) Appl. No.: 12/546,101

(22) Filed: Aug. 24, 2009

(65) Prior Publication Data

US 2010/0248511 A1    Sep. 30, 2010

Related U.S. Application Data

(60) Provisional application No. 61/164,836, filed on Mar. 30, 2009.

(51) Int. Cl.
*H02G 3/08* (2006.01)

(52) U.S. Cl. ............ 174/50; 174/59; 174/559; 439/535; 248/906

(58) Field of Classification Search .................... 174/50, 174/59, 559; 439/207, 208, 210
See application file for complete search history.

(56) References Cited

U.S. PATENT DOCUMENTS

| | | | |
|---|---|---|---|
| 4,063,110 A | 12/1977 | Glick | |
| 4,805,073 A | 2/1989 | Johnson et al. | |
| 5,434,368 A | 7/1995 | Hoffmann | |
| 5,488,208 A | 1/1996 | Seewald | |
| 6,963,037 B1 | 11/2005 | Bennett et al. | |
| 6,979,775 B2 | 12/2005 | Ritter et al. | |
| 7,140,889 B1 | 11/2006 | Shah et al. | |
| 7,147,494 B2 | 12/2006 | Lindner | |
| 7,156,674 B1 | 1/2007 | Frank | |
| 7,163,410 B2 | 1/2007 | Isaacks | |
| 7,284,995 B1 | 10/2007 | Vail | |
| 7,410,373 B2 | 8/2008 | Isaacks | |
| 7,759,575 B2 * | 7/2010 | Jones et al. | 174/50 |

* cited by examiner

*Primary Examiner* — Dhirubhai R Patel
(74) *Attorney, Agent, or Firm* — Schmeiser, Olsen & Watts LLP

(57) ABSTRACT

A device housing for signal devices that are to be placed on a premise of a user, the device housing encouraging access to certain connections and discouraging access to certain connections once the device housing is mounted to a mounting surface. The device housing includes a first housing portion defining a first cavity enclosing electrical components and a second housing portion defining a second cavity. The second housing portion adjoins the first housing portion. An adjoining wall separates the first cavity from the second cavity. An open side of the second cavity is positioned to extend along the mounting surface. At least one user connection is mounted to an external sidewall of the first housing portion, and at least one restricted connection is mounted to the adjoining wall. The restricted connection extends into the second cavity.

17 Claims, 3 Drawing Sheets

SIGNAL DEVICE HOUSING WITH INTEGRATED RESTRICTED CONNECTIONS

CROSS-REFERENCE TO RELATED APPLICATIONS

This application claims the benefit of priority under 35 U.S.C. §119(e) from U.S. Provisional Patent Application Ser. No. 61/164,836, entitled "Line Conditioning Equipment Housing with Integrated Tamper-Resistant Primary Connections," and filed on Mar. 30, 2009.

FIELD OF THE INVENTION

The present invention relates generally to a housing for a signal device. More particularly, this invention relates to a housing for a signal device used as part of a community antenna television ("CATV") system where access to certain connections are discouraged and access to certain connections are encouraged.

BACKGROUND OF THE INVENTION

At the present time, CATV systems are utilized to provide broadband internet services, voice over internet protocol ("VoIP") telephone services, television services, and music services to multiple users from a supplier. To facilitate the provision of these services, the supplier will often need to install at least one signal device (e.g., a set-top box, a modem, an amplifier, a filter, a splitter, etc.) on or near a premise of a user. Such signal devices often have at least two connections, each connection for a coaxial cable or other cable carrying signals (e.g., alternating electrical current signals, optical signals, etc.).

Existing signal devices typically have all of their connections openly accessible to the user and supplier. This arrangement has been found to be unacceptable because this arrangement permits the user to modify all of the connections, typically without knowledge required to do so correctly. Accordingly, having all of the connections openly accessible to user may allow the user to inadvertently degrade their own network connection or that of others within CATV system.

Efforts have been made to restrict access to the connections by placing the signal device inside a security enclosure. Typically, these enclosures are not integral to the equipment such that all of the connections are made inaccessible. Because there are often legitimate times when a user should have access to the connections, an arrangement where all of the connections are made inaccessible is not acceptable.

In light of the foregoing, there is an increased demand for a device housing that would restrict access to some connections and would allow access to other connections. Such restricted access would limit manipulation of certain connections by the user, and thereby minimize degradation of the CATV system.

SUMMARY

The present invention provides an enclosure that encourages access to one or more user accessible connections while discouraging access to one or more restricted connections. Accordingly, the present invention more effectively limits access to the restricted connections by providing unimpeded access to the user accessible connections.

In accordance with one embodiment of the present invention, a device housing is provided for signal devices that are to be placed on a premise of a user. The device housing encourages access to certain connections and discourages access to certain connections once the device housing is mounted to a mounting surface. The device housing includes a first housing portion defining a first cavity enclosing electrical components, and a second housing portion defining a second cavity. The second housing portion adjoins the first housing portion. The device housing further includes an adjoining wall separating the first cavity from the second cavity. The device housing further includes an open side of the second cavity positioned to extend along the mounting surface. The device housing further includes, at least one user connection mounted to an external sidewall of the first housing portion, and at least one restricted connection mounted to the adjoining wall. The restricted connection extends into the second cavity.

In accordance with one embodiment of the present invention, the second housing portion includes a top wall, two opposing side walls, the adjoining wall, and the end wall opposite the adjoining wall. The open side of the second cavity is opposite the top wall.

In accordance with one embodiment of the present invention, the device housing further includes a peripheral edge encircling one side of the first housing portion and the open side of the second housing portion. The peripheral edge includes means for attaching the peripheral edge to a mounting surface. Preferably, the open side of the second cavity extends parallel to the peripheral edge.

In accordance with one embodiment of the present invention, the end wall of the second housing portion is a distance away from the adjoining wall. The distance is sufficient to fully enclose a connector mated to the restricted connection within the second cavity.

In accordance with one embodiment of the present invention, the device housing further includes an aperture formed in an end wall of the second housing portion for the passage of at least one signal cable to the at least one restricted connection. The aperture is formed opposite the adjoining wall. Preferably the aperture is at least 1.5 times the diameter of a signal cable to be attached to the restricted connection.

In accordance with one embodiment of the present invention, the device is removably secured to a surface or mounted to a bracket on the premise of the user.

In accordance with one embodiment of the present invention, the user connections and the restricted connections extend from the electrical components in different directional planes from a center-point of said first housing portion. Preferably, the user connections extend along an x-axis and the restricted connections extend along a y-axis.

In accordance with one embodiment of the present invention, a method is provided for installing a signal device on a premise of a user. The method includes providing a device housing including a first housing portion defining a first cavity, a second housing portion defining a second cavity, an adjoining wall separating the first cavity from the second cavity, at least one user connection mounted to an external sidewall of the first housing portion, and at least one restricted connection mounted to the adjoining wall. The restricted connection extends into the second cavity. The method further includes passing a signal cable having a connector formed on an end thereof into the second cavity. The method further includes attaching the connector to the restricted connection, passing a tool through an open side of the second cavity, and tightening the connector using the tool. The method further includes attaching the device housing to a mounting surface, the mounting surface covering the open side of the second cavity.

In accordance with one embodiment of the present invention, the step of attaching of the device to the mounting surface comprises passing a fastener through a peripheral edge encircling one side of the first housing portion and the second housing portion. The fastener is at least one of a threaded fastener, a nail, a clip, a snap.

In accordance with one embodiment of the present invention, the step of attaching of the device to the mounting surface includes sliding a portion of a peripheral edge of the device housing into a groove provided on the mounting surface. The peripheral edge encircles one side of the first housing portion and the second housing portion.

In accordance with one embodiment of the present invention, the signal cable is passed through the open side of the second cavity.

In accordance with one embodiment of the present invention, the signal cable is passed the through an aperture formed in an end wall of the second housing portion. The aperture is formed opposite the adjoining wall. Preferably, the aperture is size to be at least 1.5 times the diameter of the signal cable for each restricted connection and less than 5 times the diameter of the signal cable for each restricted connection.

In accordance with one embodiment of the present invention, the end wall of the second housing portion is a distance away from the adjoining wall. The distance is sufficient to fully enclose a connector mated to the restricted connection within the extents of the second cavity.

BRIEF DESCRIPTION OF THE DRAWINGS

For a further understanding of the nature and objects of the invention, references should be made to the following detailed description of a preferred mode of practicing the invention, read in connection with the accompanying drawing in which.

DETAILED DESCRIPTION OF THE INVENTION

In the following detailed description, for purposes of explanation and not limitation, exemplary embodiments disclosing specific details are set forth in order to provide a thorough understanding of the present invention. It will be apparent, however, to one having ordinary skill in the art that the present invention may be practiced in other embodiments that depart from the specific details disclosed herein. In other instances, detailed description of well-known devices and methods may be omitted so as not to obscure the description of the present invention.

It has been determined that users often have legitimate reasons to access connections on a signal device. These reasons include when home repairs and/or home enhancements are made. It has also been determined that certain connections are more likely to degrade the overall signal quality of the CATV system than others. For example, it has been found that an improper connection to a drop line, which is the line carrying all of the signals to/from the user's premise, can adversely affect all of the CATV services provided. Further, it has been found that power connections, which often use the same style connection as the drop line for ease of installation, can cause great problems if it is detached and reattached in an incorrect manner. However, other connections, such as those used to attach televisions, modems, etc., are not as critical to the overall functioning of the CATV system. Accordingly, it has been determined that if certain, non-critical connections are made readily available to the user, the user will not be encouraged to gain access to the critical connections.

Figure 1:
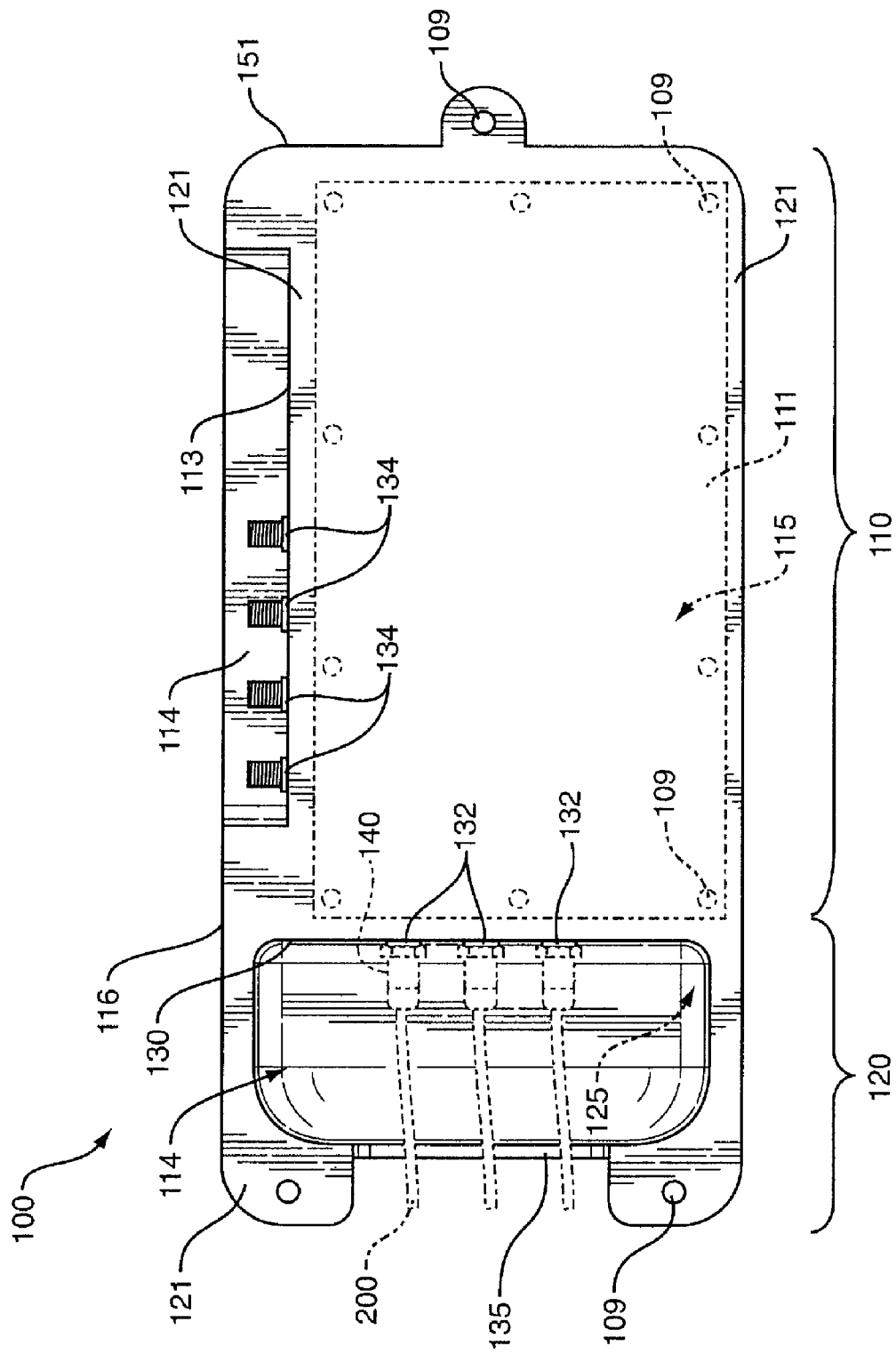
FIG. 1 is a perspective view of an illustrative embodiment of the device housing having tamper-resistant primary connections.

An external view of a device housing 100 made in accordance with one embodiment of the present invention is illustrated in FIG. 1. The device housing 100 includes one or more non-critical connections 134, which are referred to herein as user connections 134. The device housing 100 also includes one or more critical connections 132, which are referred to herein as restricted connections 132. Each of the connections 132, 134 are designed to accept a coaxial cable or other type signal carrying cable. For example, each of the connections 132, 134 may be a threaded, female "F" type connectors. It should be understood that any of the other known connectors could be used in the present device housing 100.

As illustrated in FIG. 1, the device housing 100 includes a first housing portion 110 and a second housing portion 120, which is an extension from the first housing portion 110. The first housing portion 110 defines a first cavity 115 accommodating any type of electrical components (not shown) typical of a signal device. The first housing portion 110 includes a removable base wall 111, a top wall 112 (FIG. 2), two opposing external sidewalls 113, an end wall 151, and an adjoining wall 130 opposite the end wall 151. The first cavity 115 may be sealed to prevent the ingress of water, humidity, dust, etc.

The second housing portion 120 defines a second cavity 125 accommodating the restricted connections 132. The second housing portion 120 includes the adjoining side wall 130, two opposing side walls 116, an end wall 150, and the top wall 112. The second housing portion 120 may not include a base wall such that the second cavity 125 maintains an open wall 114 on one side. The end wall 150 is positioned far enough from the adjoining wall 130 to enclose the restricted connections 132 and any cable connectors 140 therebetween.

A peripheral edge 121 encircles the base wall 111 enclosing the first cavity 115 and the open wall 114 of the second cavity 125. The peripheral edge 121 accommodates three fixing points 109 that are used to attach the device housing 100 to a mounting surface 210. The mounting surface 210 is only shown in FIG. 2 for the sake of clarity, and may extend along and abut the peripheral edge 121 to at least partially close the open wall 114 of the second cavity 125. The device housing 100 can be removably mounted to the mounting surface 210 by any means known in the art, including threaded fasteners, nails, etc. passing through the peripheral edge 121 at the fixing points 109. The peripheral edge 121 may also be slid into mating grooves provided on the mounting surface 210. Depending on the size and type of the mating grooves, an interlocking mechanical mechanism may be used to further secure the device housing 100 to the mounting surface 210. The threaded fasteners, nails, etc., may be used in addition to mating grooves.

Figure 2:
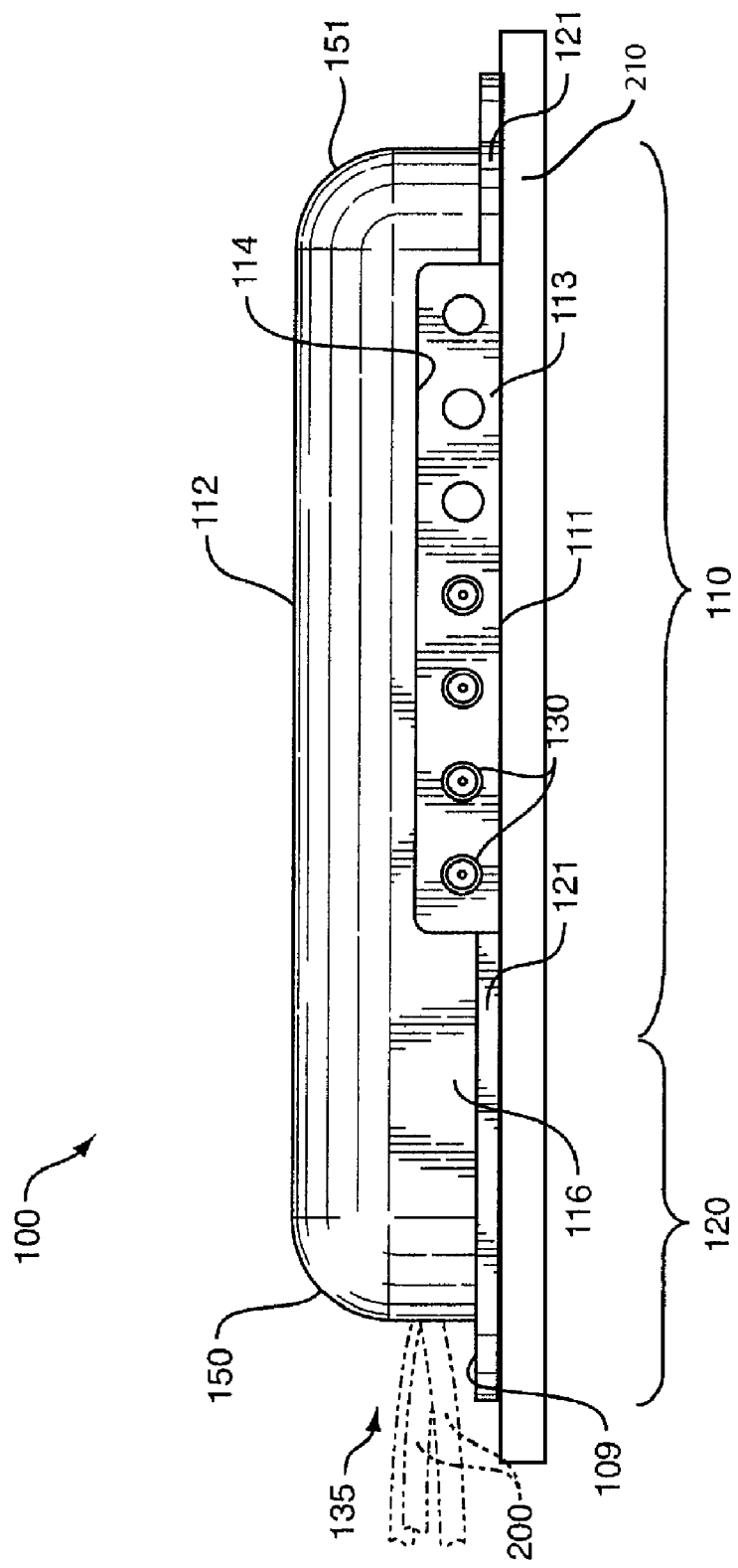
FIG. 2 is a perspective top view of an illustrative embodiment of the device housing.

An aperture 135 is provided in the end wall 150 of the second cavity 125. The aperture 135 is positioned adjacent the peripheral edge 121 such that the aperture 135 can remain open when the device housing 100 is mounted to the mounting surface 210. The aperture 135 may extend through the peripheral edge 121 as shown in FIGS. 1 and 2, or the aperture 135 may stop short of the peripheral edge 121 such the peripheral edge is not split at the aperture 135.

The aperture 135 is sized to allow signal cables 200 to pass to/from the second cavity 125, but not allow for the passage of a user's tools. For example, it has been found that if the aperture 135 is sized at least about 1.5 times a diameter of the signal cable 200 for each restricted connection 132, the signal cable 200 and any connector 140 attached thereto can be passed through the aperture 135. In one example, the aperture 135 can have a vertical dimension measured substantially perpendicular to the peripheral edge of about 1 in, and in on particular construction the vertical dimension is from about 0.25 in to about 2 in. The aperture can also have a lateral dimension measured substantially parallel to the peripheral edge of about 2.75 in. In other examples, the lateral dimension can be from about 1 in to about 3.5 in, less than about 1 in, and greater than about 3.5 in. Of course it is contemplated that other embodiments, examples, and constructions of the housings that are provided herein can have dimensions, including the vertical and horizontal dimensions of the aperture 135 that vary in accordance with the particular application.

The second cavity 125 can also have other dimensions that, while not limiting the overall concepts of the present invention, can provide some boundaries in regards to the construction, and context of the housing 100. The second cavity 125 can have, for example, a depth that is measured from the peripheral edge and which can be part of defining the volume enclosed by the second cavity 125. In one example, the depth can be sized to provide from about 0.05 in to about 1 in diametric clearance around the connector 140. In another example, the depth can have a depth dimension of about 2.0 in. In other examples, the depth dimension can be about 1 in to about 3 in. It is likewise contemplated that in some embodiments of the housing 100, the depth of the second cavity 125 can comprise more than one of depth dimension, such as if the second cavity 125 is stepped, tiered, or otherwise provided with multiple depth dimensions that are measured substantially perpendicular to the peripheral edge.

The second cavity 125 can also have a width that is measured from about the aperture 135 to a wall of the cavity 125, wherein the width is measured in a direction that is substantially parallel to the peripheral edge. In one example, the width is sized so as to provide adequate clearance about the connector 140, such as about 1 to about 1.5 times the length of the connector 140. In another example, the width can comprise a width dimension from about 1 in to about 3 in, and in one particular construction of the housing 100 the width can be from about 1.75 in to about 2.25 in.

The second cavity 125 can further have a length that defines the inner dimension at the longest portion of the second cavity 125 as measured between opposing walls. This length can be measured substantially perpendicular to the width, described above, and substantially parallel to the peripheral edge of the housing 100. In one example, the length is determined in accordance with the construction of the housing 100 such as in accordance with the number of discouraged connections in the second cavity 125. In another example, the length can be determined so as to permit from about 0.5 in to about 1 in of diametric clearance around the connectors 140. In another example, the length can be selected so as to be from greater than about 3 in. In yet other examples the length is from about 2.5 in to about 5 in.

In other embodiments of the housing, the depth of the second cavity 125 can be sized to at least enclose the connector 140 while it is attached to the restricted port 132, the aperture 135 can be sized up to 5 times the diameter of the signal cable 200 for each restricted connection 132, because the depth of the second cavity 125 renders any tool passed through the aperture 135 to be useless for untightening the connector 140. Accordingly, when the device housing 100 is mounted to the mounting surface 210, the second cavity 125 will be closed to access with the exception of the aperture 135, which is too small for the user's tools. It is envisaged that a technician for the supplier may have a specially designed tool that can access the restricted connections 132, but it is unlikely that a user will have such tools.

The user connections 134 are mounted to at least one side wall 113 of the first cavity 115. The user connections 134 and the respective side wall 113 may be recessed by an amount from the side wall 116 of the second housing portion 120 for the protection of the user connections 134. Other than for this amount of recess, the user ports 134 are positioned to be fully assessable by the user utilizing traditional tools.

For exemplary purposes, and not limitation, the restricted connections 132 and user connections 134 have been arranged in a linear array within two different directional planes, such as X and Y. Any number of connections, however, may be included in any sidewall 113, 116 while providing the restricted connections in a separate cavity, such as the second cavity 125.

In view of the foregoing, it is contemplated that embodiments of the housing 100, 200 are configured to moderate access to the various connections, e.g., connections 132, 134. That is, because the configuration of housings that are made in accordance with the concepts of the present invention make certain ones of the connections more difficult to access than other ones of the connections, such housings are likely to influence which of the connections are utilized by a user. For example, restricted connections like the restricted connections 132, the access of which requires tools, implements, devices, or otherwise the manual manipulation of the housing, are more likely to discourage the user from utilizing these restricted connections in lieu of the more readily available connections on the housing. In another example, accessible connections like user connections 134, the access of which requires little, if any, user manipulation, are more likely to encourage the user to utilize these user connections in lieu of the less readily available connection on the housing.

Figure 3:
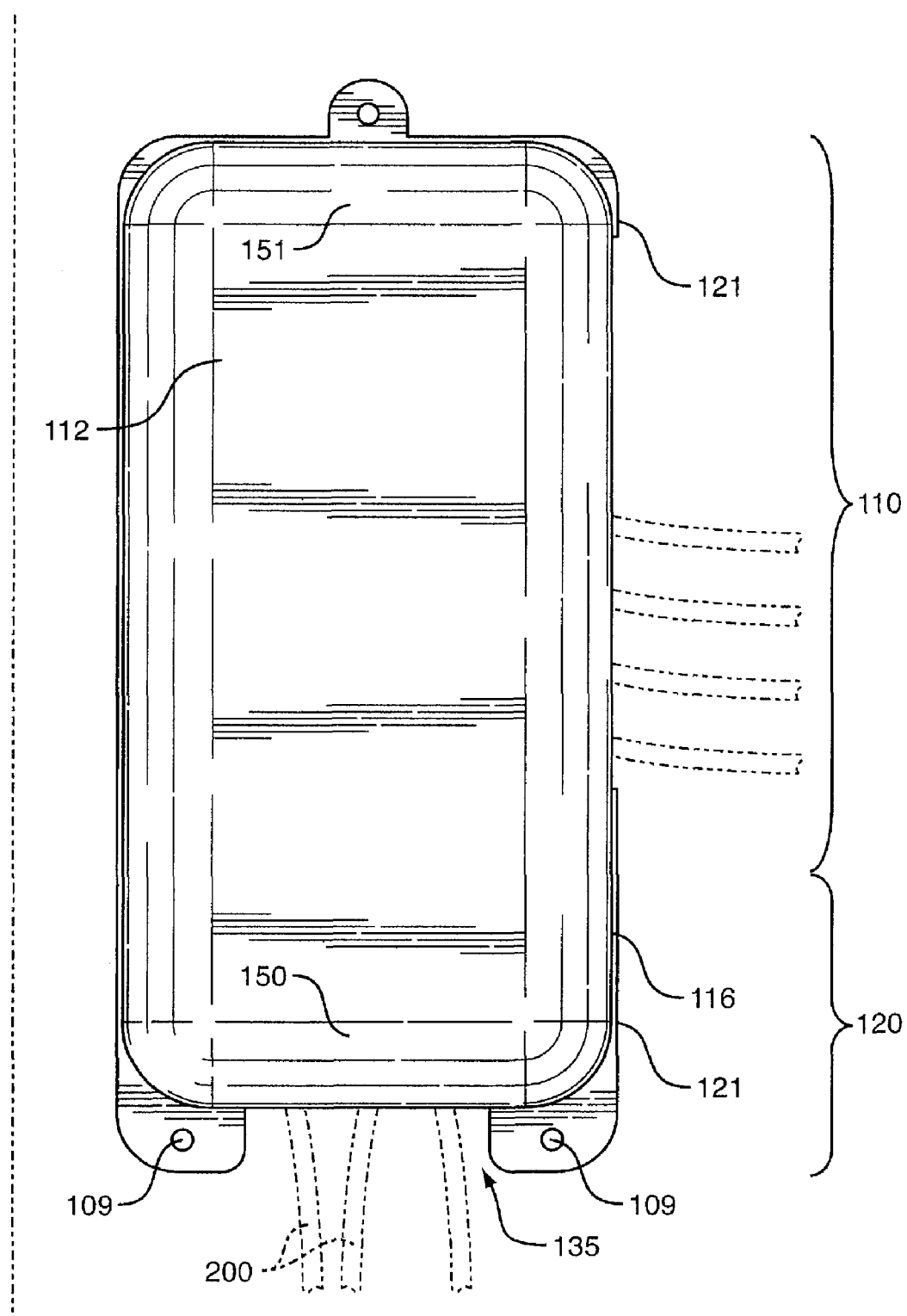
FIG. 3 is a front, plan view of another embodiment of a device housing in a mounted configuration.

Discussing this concept of the present invention in more detail, and with reference to FIGS. 1-3, the housing 100 is illustrated. The housing 100 is shown in one of its mounted configurations on, e.g., a wall, table, television, and floor, among many others. There is also provided in the housing 100 a number of encouraged connections 134, and a number of discouraged connections 132. More particularly, it is seen that the housing 100 is constructed in a manner that permits access to the encouraged connections 134 in a manner that limits the user's interface with the housing 100 to access the encouraged connections 134. On the other hand, it is seen that the housing 100 is also constructed in a manner that moderate access to the discouraged connections 132 in a manner that increases the user's interface with the housing 100.

For example, the discouraged connections 132 are situated in the housing 100 so as to substantially cover the connector ends of the cables. This, in turn, may require that the user have a special tool, or implement, that can reach inside of the housing 100 in order to access the discouraged connections 132. In another embodiment, the limited access to the connector ends of the cables may require the user to displace the housing 100 from its mounted configuration, which may also require special tools and implements that are not readily available to the user.

By comparison, but by way of non-limiting example, the encouraged connections 134 are situated in the housing 100 so as to substantially expose the connector ends of the cables. Preferably, but not necessarily, this configuration does not require the user to interface with the housing 100. Instead it encourages the user to utilize the encouraged connections 134, e.g., by connecting and disconnecting cables to the exposed connector ends on the encouraged connections 134.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the present disclosure.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A device housing for signal devices that are to be placed on a premise of a user, the device housing encouraging access to certain connections and discouraging access to certain connections once the device housing is mounted to a mounting surface, the device housing comprising:
   a first housing portion defining a first cavity enclosing electrical components, wherein the first housing portion comprises a top wall, two opposing side walls, an adjoining wall, and an end wall opposite the adjoining wall;
   a second housing portion defining a second cavity, wherein the second housing portion comprises a top wall, two opposing side walls, the adjoining wall, and the end wall opposite the adjoining wall, the second housing portion adjoining the first housing portion; an adjoining wall separating the first cavity from the second cavity; an open side of the second cavity positioned to extend along the mounting surface;
   at least one user connection mounted to an external sidewall of the first housing portion, wherein the at least one user connection has encouraged access; and
   at least one restricted connection mounted to the adjoining wall, the restricted connection extending into the second cavity, wherein the at least one restricted connection has discouraged access.

2. The device housing of claim 1, wherein the open side of the second cavity is opposite the top wall of the first housing.

3. The device housing of claim 1 further comprising a peripheral edge encircling one side of the first housing portion and the open side of the second housing portion, the peripheral edge comprising means for attaching the peripheral edge to a mounting surface.

4. The device housing of claim 3, wherein, the open side of the second cavity extends parallel to the peripheral edge.

5. The device housing of claim 1, wherein the end wall of the second housing portion is a distance away from the adjoining wall, the distance being sufficient to fully enclose a connector mated to the restricted connection within the second cavity.

6. The device housing of claim 1 further comprising an aperture formed in an end wall of the second housing portion for the passage of at least one signal cable to the at least one restricted connection, the aperture being formed opposite the adjoining wall.

7. The device housing of claim 6, wherein the aperture is at least 1.5 times the diameter of a signal cable to be attached to the restricted connection.

8. The device housing of claim 1, wherein the device is removably secured to a surface or mounted to a bracket on the premise of the user.

9. The device housing of claim 1, wherein the user connections and the restricted connections extend from the electrical components in different directional planes from a centerpoint of said first housing portion.

10. The device housing of claim 1, wherein user connections extend along an x-axis and the restricted connections extend along a y-axis.

11. A method of installing a signal device on a premise of a user, the method comprising:
   providing a device housing comprising a first housing portion defining a first cavity, wherein the first housing portion comprises a top wall, two opposing side walls, an adjoining wall, and an end wall opposite the adjoining wall, a second housing portion defining a second cavity, wherein the second housing portion comprises a top wall, two opposing side walls, the adjoining wall, and the end wall opposite the adjoining wall, the adjoining wall separating the first cavity from the second cavity, at least one user connection mounted to an external sidewall of the first housing portion, wherein the at least one user connection has encouraged access, and at least one restricted connection mounted to the adjoining wall, the restricted connection extending into the second cavity, wherein the restricted connection has discouraged access; passing a signal cable having a connector formed on an end thereof into the second cavity; attaching the connector to the restricted connection; passing a tool through an open side of the second cavity;
   tightening the connector using the tool; and attaching the device housing to a mounting surface, the mounting surface covering the open side of the second cavity.

12. The method of claim 11, wherein the step of attaching of the device to the mounting surface comprises passing a fastener through a peripheral edge encircling one side of the first housing portion and the second housing portion, the fastener being at least one of a threaded fastener, a nail, a clip, a snap.

13. The method of claim 11, wherein the step of attaching of the device to the mounting surface comprises sliding a portion of a peripheral edge of the device housing into a groove provided on the mounting surface, the peripheral edge encircling one side of the first housing portion and the second housing portion.

14. The method of claim 11, wherein the signal cable is passed through the open side of the second cavity.

15. The method of claim 11, wherein the signal cable is passed the through an aperture formed in an end wall of the second housing portion, the aperture being formed opposite the adjoining wall.

16. The method of claim 15, wherein the aperture is size to be at least 1.5 times the diameter of the signal cable for each restricted connection and less than 5 times the diameter of the signal cable for each restricted connection.

17. The method of claim 11, wherein the end wall of the second housing portion is a distance away from the adjoining wall, the distance being sufficient to fully enclose a connector mated to the restricted connection within the extents of the second cavity.

* * * * *